United States Patent Office 3,521,897
Patented July 28, 1970

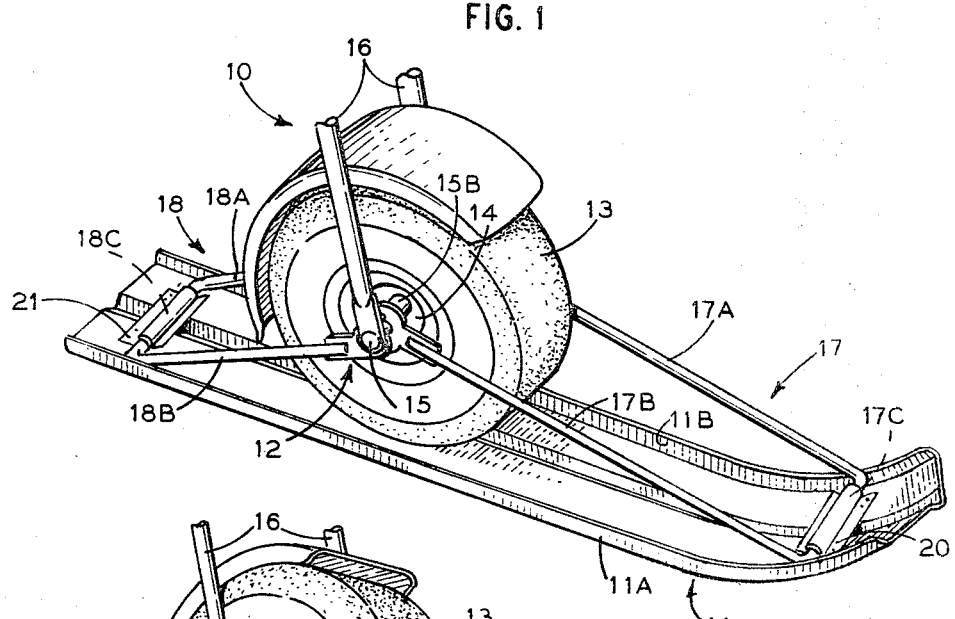
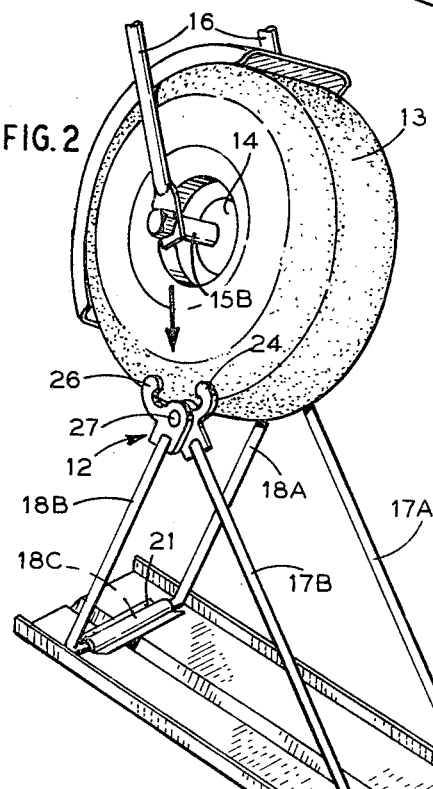
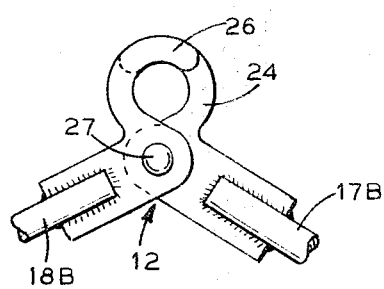
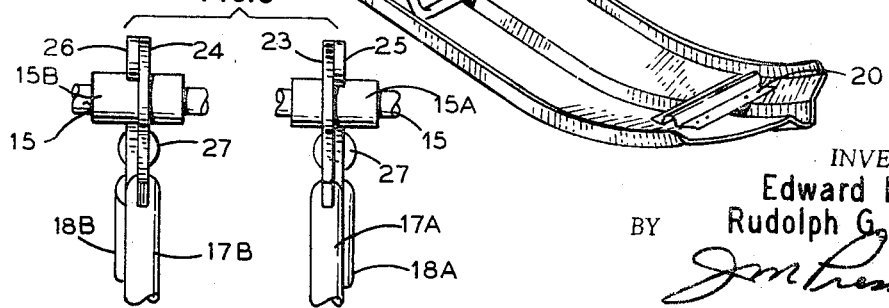

3,521,897
MECHANISM FOR DETACHABLY ATTACHING A RUNNER TO A VEHICLE WHEEL
Edward R. Fester, St. Joseph, and Rudolph G. Lechner, Benton Harbor, Mich., assignors to Heath Company, Benton Harbor, Mich., a corporation of Delaware
Filed Nov. 1, 1968, Ser. No. 772,680
Int. Cl. B62b *19/02*
U.S. Cl. 280—13                           12 Claims

ABSTRACT OF THE DISCLOSURE

An attachment mechanism for detachably mounting a vehicle wheel to an elongated runner, such as a ski. Each mechanism comprises two U-shaped clamping and support members and each of such members comprises two coextensive, rigid side struts, a base rod which joins one end of each strut, and a jaw-like element affixed to the opposite end of each strut. The struts are pivotally connected together adjacent the opposite ends thereof, such that the jaws on one strut coact with the jaws on the other strut to open when the struts are pivoted toward one another and to close, and thereby clamp tightly about portions of the axle on each side of the vehicle wheel hub, when the struts are spread apart. With the struts spread apart and with the vehicle wheel in contact with the runner, the two base rods are clamped to the runner by spring clips which are fixedly mounted at respective forward and rearward locations on the runner. To prevent relative lateral motion between the clamped wheel and the runner, especially when the wheel is being turned, the struts of one of the U-shaped members are positioned close enough to bear against opposite sides of the wheel.

---

This invention relates to devices for adapting a wheeled vehicle for travel over relatively soft surfaces such as snow or sand, and more particularly, to clamp-on runner attachments for wheeled vehicles.

The prior art is replete with devices which are designed to be variously mounted on one or more wheels of vehicles, such as the wheels of automobiles, wagons, aircraft, motor cycles and bikes to convert the vehicle into one which will travel with at least some facility over relatively soft surfaces, such as snow or sand.

Such devices typically take the form of "runners," for example, sled runners, short skis and the like, which are detachably attached by various types of mechanisms to the wheels, particularly to the front wheel or wheels, of the vehicle. Conventional attachment mechanisms which are used for the specified purpose typically require either small retaining parts, such as nuts, bolts and washers which must be removed to detach the runner from the wheel, or employ relatively complicated linkages. Such linkages usually require considerable numbers of moving parts which suffer the disadvantages of being relatively difficult to manipulate and operate, relatively expensive to manufacture and highly susceptible to malfunctioning, especially under adverse weather or other adverse ambient conditions.

Conventional attachment mechanisms of the former type requiring small retaining parts suffer the disadvantage that one or more of such parts may be lost or misplaced, especially if the attachment mechanism is removed from the vehicle wheel and stored. Such is oftentimes the case when the mechanism is used to mount runners, such as snow skis, which are ordinarily used on the vehicle during only certain times of the year and then, for only relatively short periods of time. In addition, the former type of clamping devices typically require additional tools, such as wrenches and/or screwdrivers, to effect the necessary assemblage of the various parts.

It is an object of this invention to provide improved mechanism for detachably mounting a member to a vehicle wheel, or vice versa.

Another object of this invention is to provide a mechanism requiring but few moving parts for detachably mounting a runner to the front wheel of a cycle-type vehicle such that the wheel and runner are firmly constrained against relative movement.

According to the instant invention, there is provided a relatively simple and inexpensive mechanism for detachably mounting a vehicle wheel to a runner, and more particularly, the tire of a cycle-type vehicle wheel to a ski. The attachment mechanism includes two coacting bifurcated clamping and support members. Each support member is comprised of a pair of struts having one free end, the opposite ends of each pair of struts being joined together by a transverse base rod, both base rods being movable along the upper surface of the ski. Ssecured to the free end of each strut is a flat, hook-shaped jaw. The two support members are joined at the jaw-moounting ends thereof for pivotal movement relative to each other in such a manner that the jaws of one support member coact with the jaws of the other support to open when the base rods of two members are moved toward one another and to close and clamp tightly around the wheel axle when the members are spread apart. The two support members with the jaws secured thereto are the only two parts which need be moved to effect the attachment of the wheel to the ski.

Clamping devices, taking the form of two open-ended spring clips, are mounted at respective forward and rearward locations on the surface of the ski which is contacted by the tire and serve to clamp the base rods against further spreading when the jaws have closed sufficiently to clamp tightly around the wheel axle. The detaching of the attaching mechanism may be readily and easily effected by applying enough inward pressure on one of the support members to force its corresponding base rod out of its respective spring clip and toward the other base rod far enough for the jaws to open and permit the removal of the wheel axle from the mechanism. Any appreciable relative lateral movement between the wheel and the runner is prevented by having the wheel tire seat tightly between one pair of struts.

The above object together with other advantages will become apparent after reading the following detailed description wherein reference is made to the accompanying drawings forming a part thereof, and in which:

FIG. 1 is a perspective view of a vehicle wheel mounted on a runner by the attachment mechanism of the instant invention;

FIG. 2 is another perspective view of the attachment mechanism illustrated in FIG. 1, showing the mechanism in a position on the runner to receive a raised vehicle wheel;

FIG. 3 is a fragmentary end view of the mechanism spread apart and mechanism clamping jaws clamped around a vehicle wheel axle; and FIG. 4 is a fragmentary side view of the clamping jaws illustrated in FIG. 3, as viewed from the left of FIG. 3.

Referring now to the drawings, there is illustrated in FIG. 1 a conventional vehicle wheel assembly 10 which is detachably clamped to an elongated runner 11 by the instant attachment mechanism 12.

The assembly 10 is exemplary of a conventional front wheel assembly of a cycle-type vehicle, such as a motor bike or motor cycle which is adapted for use on soft supporting surfaces, such as snow or sand, by the attachment of the runner 11 thereto. As such, the wheel assembly 10 includes a relatively wide pneumatic tire 13 conventionally mounted on a wheel hub 14. The hub 14 is journaled for rotation on a front axle 15, the ends of the axle 15 being connected to the lower ends of a bifurcated front steering fork 16. Two cylindrical, hollow spacer sleeves 15A and 15B, FIG. 3, of identical size and shape are mounted concentrically on the axle 15 between the inner surface of each lower end of the fork 16 and the adjacent outer end of the hub 14. The sleeves 15A and 15B serve to locate the hub 14 centrally on the axle and to provide clamping surfaces for the attachment mechanism 12. The forward end of the runner 11 is turned upwardly to travel as a ski over snow, ice and so forth. The runner may be composed of any suitable material, such as sheet steel.

To increase the flexural rigidity of the runner 11 a central portion thereof may be channeled longitudinally, as illustrated in FIG. 1. Additional flexural rigidity may be obtained by having the runner edges extend upwardly and out of the plane of the upper tire-contacting runner surface to form flanges 11A and 11B, respectively. The flanges 11A and 11B thus formed, are laterally spaced apart a distance slightly greater than the width of the tire 13 so that with the wheel assembly 10 attached to the runner 11 the tire 13 will rest upon the upper surface of the runner and seat between the flanges 11A and 11B. The flanges may also be used as guideways for portions of the attachment mechanism 12, as will be evident subsequently.

The mechanism 12 comprises forward and rearward mounting members 17 and 18, respectively, of substantially U-shape, FIG. 2. Each mounting member 17 and 18 is comprised of two parallel pairs of rigid, rod-like struts 17A, 17B and 18A and 18B, respectively, of circular cross-sectional shape, the struts of each pair being of equal length and each pair of struts being laterally spaced far enough apart to nest the tire 13 therebetween. The two struts forming each mounting member 17 and 18 are joined together by rigid base rods 17C and 18C, respectively, also of circular cross-sectional shape, the base rods being detachably clamped at longitudinally spaced-apart points to the upper tire-contacting surface of the runner 11 by spring clips or brackets 20 and 21 located forwardly and rearwardly, respectively, on the runner.

The spring clips 20 and 21 are oriented perpendicularly to the longitudinal runner axis and are formed of a suitable resilient material, such as spring steel. The inner edges of the clips are raised just far enough from the tire-contacting surface of the runner 11 to permit the forced insertion thereunder of a respective one of the base rods 17C and 18C. The length of the clips may be equal but are at least slightly less than the lateral distances between the respectively strut pairs 17A, 17B and 18A, 18B so that only the raised ends of the clips slide over the circular surface of the base rods 17C and 18C during the insertion process. The outer edges of the clips 20 and 21 are secured by, for example, rivets or screws to the forward and rearward ends, respectively, of the runner. Intermediate portions of the clips 20 and 21 are semi-circular and curved upwardly to conform and mate closely with upper circular peripheral portions of the base rods 17C and 18C which are forced under the clips. The clips are of substantial length so as to prevent the base rods from twisting out the semicircular clip portions during normal usage of the mechanism.

With reference to FIGS. 3 and 4, the clamping end of each strut has a flat jaw suitably affixed thereto by, for example, welding. The two jaws fixed to the struts 17A and 17B are designated 23 and 24, respectively, and the two jaws fixed to the struts 18A and 18B are designated 25 and 26, respectively. The jaws 23–26, inclusive, are identical to one another, each jaw having a flat, hook-like end extending outwardly and forwardly of that portion of the jaw body which is contiguous to a strut. Each hook-like end forms an inner arcuate gripping edge of slightly larger radius than the outer radius of the spacer sleeves 15A and 15B which are to be gripped by these jaws. The struts 17A and 17B may be positioned closer together than the struts 18A and 18B, FIGS. 2 and 3, to grip the tire 13 therebetween. Thus, the outer flat surfaces of the jaws 23 and 24 on the struts 17A and 17B, respectively, are mounted flush against the inner flat surfaces of the jaws 25 and 26, respectively. To ensure high frictional engagement between the jaws and the spacer sleeves, the arcuate inner edge of each clamping jaw may be semicircular and of a radius slightly larger than the radius of the sleeves 15A and 15B. To further increase this frictional engagement, the outer surfaces of the sleeves 15A and 15B may be roughened in any appropriate manner.

With each pair of jaws 23, 25 and 24, 26 laterally aligned such that the arcuate gripping edge of one jaw of each pair faces as a virtual mirror image, the other jaw of that pair, FIG. 4, jaw pairs 23, 25 and 24, 26 are connected for pivotal movement by passing a connecting pin 27, such as a rivet, through laterally-aligned circular holes formed in each coacting jaw pair. To provide a moment arm between the outwardly extending arcuate gripping edge of each jaw and the longitudinal or fulcrum axis of an attached strut, the circular holes may be aligned with the longitudinal strut axes. The two pins 27, in the jaw pairs 23, 25 and 24, 26 are practically concentric and being eccentrically disposed with respect to the arcuate jaw edges provide a common pivotal aixs for the members 17 and 18.

As illustrated in FIG. 1, it is usually desired that the vehicle tire 13 be positioned slightly rearwardly of the runner 11. With the clips 20 and 21 mounted adjacent respective forward and rearward runner ends and with the tire 13 nested between the flanges 11A and 11B and resting firmly against the upper surface of the runner, it will be apparent that the forward struts 17A, 17B need be somewhat longer than the rearward struts 18A, 18B. To prevent any relative lateral motion between the tire 13 and the struts 17A and 17B, particularly when the tire 13 is turned, and to reinforce the longitudinal rigidity of these struts, the outer edge portions of the tire 13 should firmly nest between the struts 17A, 17B. This is accomplished by having the lateral spacing between the struts 17A and 17B slightly larger than the width of the tire, when the tire is not subjected to any external loading force, such as the weight of the vehicle. Thus, when the tire is attached to the runner and loaded, the walls of the tire expand slightly outwardly to seat tightly against the struts 17A and 17B. In some instances it may be necessary to either deflate and/or inflate the tire to achieve a tight seating of the tire between the front struts.

With the tire 13 resting firmly upon the upper surface of the runner, the forward and rearward members 17 and 18 and the tire 13 provide structural reinforcement for the runner, especially the upwardly-curved front runner end. Additionally the tire dampens shocks received by the runner during usage thereof.

Considering now the procedure for mounting the vehicle wheel assembly 10 to the runner 11, or vice versa, with the runner 11 in a horizontal position, the rearward base rod 18C of the member 18 is manually forced under the rearward clip 21 and thusly clamped to the rearward end of the runner. As mentioned hereinabove, if the runner 11 is provided with flanges 11A and 11B the rod 18C will be automatically guided in its rearward movement toward the clip 21. The forward member 17 is then slid toward the now-clamped member 18 until the two pairs of jaws 23, 25 and 24, 26, respectively, open far enough to receive the sleeves 15A and 15B, respectively. The relative position of the members 17 and 18 will be as depicted by FIG. 2. The front wheel assembly is raised and then lowered, as indicated by the arrow in FIG. 2, until the sleeves 15A and 15B engage the open jaws. The front wheel assembly is then further lowered slightly, whereupon the member 17, acting in response to a downward pressure against its jaws 23, 25 and the connecting pins 27, drives the forward base rod 17C forwardly partially under the raised edge of the spring clip 20. A slight additional downward force on the wheel assembly 10 will cause the tire to bear firmly against the upper surface of the runner 11 and the rod 17C will be driven completely under the raised edge of the forward spring clip 20 and into tight mating relationship with the upwardly curved portion of this clip. At this time, both members 17 and 18 will be locked against further movement and the jaws 23, 25 and 24, 26 will have closed sufficiently to clamp tightly around the outer surfaces of the sleeves 15A and 15B, respectively. If the tire 13 under load conditions either does not seat tightly, or seats too tightly, against the inner edges of the forward struts, appropriate compensating adjustments may be made to the tire pressure.

The mechanism 12 may be detached from the runner and vehicle by reversing the described procedure. Advantageously, the mechanism 12 folds flat for compact storage.

The sleeves 15A and 15B may also take the form of two concentric, cylindrical lugs which are brazed or otherwise rigidly affixed to the fork ends of the front wheel assembly and, of course, if end portions of the axle 15 are available, the jaws may be sized to grip such ends directly. In those instances where the vehicle is relatively light and portable, the attaching mechanism 12 may be employed to mount such vehicle on the vehicle-transporting medium. In such case, means may also be provided by the medium to suitably mount the runner.

What is claimed is:

1. Attachment mechanism for detachably mounting a vehicle wheel assembly on an elongated runner, the wheel assembly including means engageable by the attachment device mechanism when the vehicle wheel contacts the runner, the attachment mechanism comprising, a first bifurcated mounting member having two ends, first and second jaws mounted on different ones of the first member ends, a second bifurcated mounting member having two ends, third and fourth jaws mounted on different ones of the second member ends, connecting means adjacent the ends of said first and second members for pivotally connecting the first and third jaws, respectively, and the second and fourth jaws, respectively, such that the respective jaw pairs open when the mounting members are moved toward one another and close to grip the engageable means when said members are pivoted apart, first means mounted on said runner for rotatably mounting a portion of said first mounting member remote from said first and second jaws, and second means mounted on said runner in spaced relation to the first mounting means for engaging a portion of the second mounting member remote from said third and fourth jaws when the members are pivoted apart sufficiently for said vehicle wheel to contact said runner and said jaws to close and grip said engageable means.

2. Mechanism as claimed in claim 1, wherein each of said mounting members is of generally U-shape and includes a pair of coextensive, rigid struts, the lateral spacing between one pair of said struts being substantially equal to the width of said vehicle wheel so that said vehicle wheel contacts one of said struts when turned.

3. Mechanism as claimed in claim 1, wherein each of said mounting members is of generally U-shape and comprises, two coextensive, rigid struts, a base rod joining two ends of said struts together, one of said jaws being mounted on an opposite end of each strut, and wherein the first and second mounting means comprises, respective first and second clamping devices having respective inner edge portions thereof spaced from the runner sufficiently to permit the insertion of each base rod between one of said clamping devices and said runner.

4. The mechanism as claimed in claim 1, wherein said clamping devices are cantilevered on said runner and composed of a resilient material.

5. Attachment mechanism for detachably mounting an elongated runner on a vehicle wheel assembly, the vehicle wheel assembly including plural spaced-apart, concentric, cylindrical elements engageable by the attachment mechanism, the mechanism comprising, a first bifurcated member having two ends, first and second jaws, having opposed arcuate element gripping edges, mounted on different ones of the two ends of said first member, a second bifurcated member having two ends, third and fourth jaws, having opposed arcuate element gripping edges, mounted on different ones of the two ends of said second member, means pivotally connecting the first and second members such that the arcuate edges of said first and second jaws of the said first member cooperate with the arcuate edges of the third and fourth jaws, respectively, of the second member to clamp tightly upon a different one of said elements, each of said jaws pivoting to an open position for releasing said elements when said members are relatively close together and pivoting to a closed position for tightly gripping said elements when said members are pivoted apart, and plural spring clamps located at different spaced-apart locations on said runner for tightly clamping portions of said bifurcated members remote from said jaws to said runner when the wheel of said vehicle wheel assembly contacts said runner and said jaws clamp said mounting elements.

6. In combination, a vehicle wheel assembly, a runner and attachment mechanism for detachably mounting the vehicle wheel assembly on the runner, the wheel assembly including a hub member mounting a pneumatic tire and a cylindrical axle journaled on said hub member and having a section on each side of said hub grippable by the attachment mechanism, said runner being elongated and having forward and rearward portions, said mechanism comprising, a first substantially U-shaped, rigid wheel assembly supporting member having respective free and joined ends, first and second jaws having semicircular edges affixed to different ones of the free ends of said first supporting member, a second substantially U-shaped, rigid wheel assembly supporting member, third and fourth jaws having semicircular edges affixed to a different one of the free ends of said second member, means pivotally connecting the first and second mounting members at said jaws eccentrically of said edges such that the first and second jaws and the third and fourth jaws are mounted in respective side-by-side relationship thereof defining arcuate gripping surfaces which release said axle sections when the mounting members are relatively close together and which grip said axle section when said mounting members are pivoted apart, first and second resilient clamping brackets mounted forwardly and rearwardly, respectively, on said runner for receiving and clamping a different one of the joined ends of said wheel-supporting members when said axle is gripped by said jaws and said pneumatic tire rests upon said runner.

7. The combination as claimed in claim 6, wherein one of said wheel assembly supporting members is longer than the other of said members and wherein the long of said members tightly seats the veicle tire therebetween.

8. The combination as claimed in claim 7, wherein the longer of said members is clamped by the first of said clamping brackets.

9. The combination as claimed in claim 6, wherein said first and second jaws are positioned inwardly of said third and fourth jaws.

10. The combination as claimed in claim 9, wherein the semicircular edges of said first and second jaws face generally toward the rearward runner portion and wherein the semicircular edges of said third and fourth jaw face generally toward the forward runner portion.

11. The combination as claimed in claim 10, wherein outermost end portions of the first and third jaws and outermost end portions of the second and fourth jaws, respectively, overlap one another when the jaws grip said axle sections.

12. The combination as claimed in claim 6, wherein said wheel assembly includes a steering mechanism having bifurcated ends attached to different ends of said axle remote from said hub, and wherein said axle sections comprise two cylindrical spacer sleeves fixedly mounted on said axle on different sides of said hub and between the bifurcated ends of said steering mechanism.

References Cited

UNITED STATES PATENTS

| | | | |
|---|---|---|---|
| 448,754 | 3/1891 | Radley | 280—14 X |
| 1,359,254 | 11/1920 | Krupsky | 280—14 |
| 2,598,682 | 6/1952 | Giovannoni | 280—14 |

RICHARD J. JOHNSON, Primary Examiner

U.S. Cl. X.R.

280—20